United States Patent [19]
Zisner et al.

[11] Patent Number: 5,549,876
[45] Date of Patent: Aug. 27, 1996

[54] PRODUCTION OF POTASSIUM SULFATE USING DIFFERENTIAL CONTACTING

[75] Inventors: Tuvia Zisner, Raanana; Curt Holdengraber, Qiryat Tivon; Shalom Lampert, Maalot, all of Israel

[73] Assignee: Dead Sea Works, Beer Sheva, Israel

[21] Appl. No.: 348,114

[22] Filed: Nov. 28, 1994

[51] Int. Cl.⁶ ............................................. C01D 5/00
[52] U.S. Cl. ............................... 423/199; 423/552
[58] Field of Search .................................. 423/552, 199

[56] References Cited

U.S. PATENT DOCUMENTS 3,369,867  2/1968  May ............................. 423/552

FOREIGN PATENT DOCUMENTS 244540  12/1985  German Dem. Rep. .
212724   8/1984  Germany ...................... 423/552
464040   4/1937  United Kingdom .......... 423/552

OTHER PUBLICATIONS

Scherzberg, H.; Schmitz, R.; and Wonlk, W.: Phophorus and Potassium No. 178 (1992), 20–26.

*Primary Examiner*—Wayne Langel
*Attorney, Agent, or Firm*—Mark M. Friedman

[57] ABSTRACT

A process for the manufacture of potassium sulfate from a sodium sulfate source, potash and water, comprising the steps of: (a) introducing the sodium sulfate source, water and potash into a differential countercurrent contactor; and (b) causing the sodium sulfate source, potash and water to contact differentially to produce potassium sulfate.

11 Claims, 4 Drawing Sheets

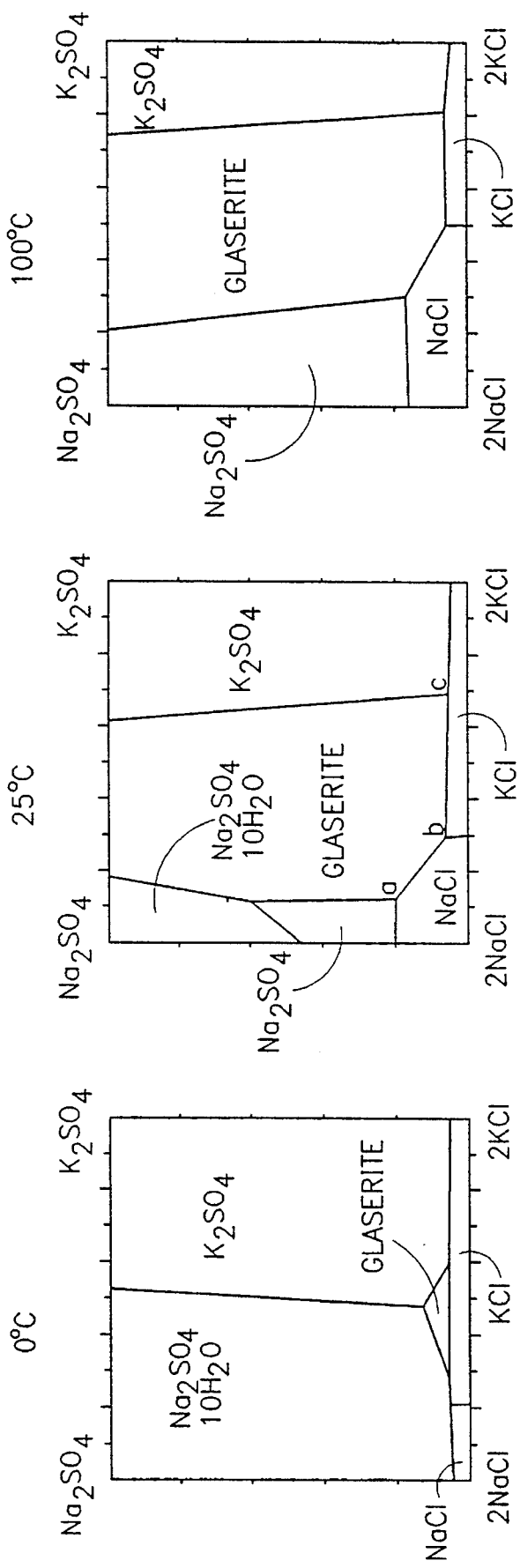

PRODUCTION OF POTASSIUM SULFATE USING DIFFERENTIAL CONTACTING

FIELD AND BACKGROUND OF THE INVENTION

The present invention relates to processes for producing potassium sulfate from potash and a source of sodium sulfate, such as anhydrous sodium sulfate or bloedite.

The overall reaction for producing potassium sulfate from sodium sulfate and potash can be described as:

$$Na_2SO_4 + 2KCl = K_2SO_4 + 2NaCl$$

In water, however, the reaction is subject to the thermodynamic constraints of the $Na_2SO_4/2NaCl/K_2SO_4KCl/H_2O$ system. The data for the system are most conveniently represented on a Janeeke phase diagram (FIG. 1). The relevant invariant points, which are referred to in the subsequent description, are:

| invariant point (a) | solution in equilibrium with $Na_2SO_4$, NaCl and glaserite ($K_3Na(SO_4)_2$); |
| --- | --- |
| invariant point (b) | solution in equilibrium with KCl, NaCl and glaserite; |
| invariant point (c) | solution in equilibrium with KCl, $K_2SO_4$ and glaserite. |

The compositions of the invariant points (a), (b) and (c) at 25° C. are as follows:

| INVARIANT POINT | $K_2^{+2}$ (mole %) | $Cl_2^{-2}$ (mole %) | $H_2O$ mole/mole salts |
| --- | --- | --- | --- |
| (a) | 14.6 | 79.2 | 14.9 |
| (b) | 29.3 | 93.7 | 14.7 |
| (c) | 68.6 | 94.5 | 19.5 |

From the phase diagram (FIG. 1), it is evident that for any feed mixture of potash, sodium sulfate, and water, pure sodium chloride cannot be removed as a by-product. In addition, it is apparent that a reasonable potassium conversion can only be achieved in a two-stage reaction through the intermediate product glaserite. The two-stage reaction is illustrated schematically in FIG. 2 and includes the following stages:

Stage 1: Production of glaserite from sodium sulfate, potash, and Stage 2 liquor;

Stage 2: Production of potassium sulfate from potash, water, and glaserite from Stage 1.

The glaserite produced in Stage 1 is separated from the mother liquor in a suitable solid/liquid separator and introduced into Stage 2. Potash and water are introduced along with the glaserite and any unreacted potash from Stage 1. The potash and glaserite solids dissolve, generating a supersaturation solely with respect to potassium sulfate, such that potassium sulfate is selectively precipitated. The maximum conversion is obtained when the mother liquor approaches the $KCl/K_2SO_4$/glaserite/$H_2O$ invariant point. The potassium sulfate slurry is separated and dried. The mother liquor removed from the reactor is returned to Stage 1.

The separated liquor from the glaserite contains substantial quantities of dissolved potassium and sulfate, which generally warrants a recovery operation. Currently known processes use the two-stage configuration, but differ in the scheme used to retrieve the potassium and sulfate values.

There are numerous problems associated with the solid/liquid separation of glaserite which is required in all known processes. Large glaserite particles filter relatively well but require a long residence time in the glaserite formation stage (Stage 1) and an even longer residence time in Stage 2, due to the slow dissolution kinetics of glaserite.

Small glaserite particles filter poorly. Moreover, the amount of adhering mother liquor is greatly increased with decreasing particle size. The mother liquor is rich in sodium (65–86 mole %) and in chloride (75–95 mole %), both of which reduce product quality. While some of the sodium introduced to Stage 2 can leave with the potassium sulfate product as glaserite, provided that the potassium content of the product satisfies the product specification, the rest must be dissolved in the effluent liquor.

Another source of "sodium-poisoning" is the potash feed. Agricultural-grade potash typically contains 3–4% NaCl, which must also be removed in the Stage 2 effluent liquor. Since at the optimum theoretical operating point (the $KCl/K_2SO_4$/glaserite/$H_2$invariant point), the solution contains ~71% $H_2O$ and under 3% sodium, about 25 kg of excess water must be added in Stage 2 to remove each additional kg of sodium introduced.

Sodium poisoning decreases the potassium conversion of the reaction train, and increases the feed water requirements, as can be seen from FIG. 3. Hence, the evaporation load in the recovery stage is increased, as are the equipment and energy costs. Energy costs are further increased because of additional heating and cooling costs for the enlarged recycle streams.

Moreover, the Stage 2 mother liquor adhering to the potassium sulfate crystals is a major source of sodium and chloride in the product, and can necessitate additional and costly process stages such as repulping or thorough washing.

Thus, there is a widely recognized need for, and it would be highly advantageous to have, a way of producing potassium sulfate from sodium sulfate which would be more efficient and more economical than heretofore known.

SUMMARY OF THE INVENTION

According to the present invention there is provided a process for the manufacture of potassium sulfate from a sodium sulfate source, potash and water, comprising the steps of: (a) introducing the sodium sulfate source, water and potash into a differential countercurrent contactor; and (b) causing the sodium sulfate source, potash and water to contact differentially to produce potassium sulfate.

The present invention successfully addresses the shortcomings of the presently-known configurations by effecting all or some of the reaction and washing stages using differential, countercurrent contacting. This eliminates the costly and troublesome separation and handling of glaserite and also improves the reaction kinetics. Sodium poisoning of Stage 2 is prevented or substantially reduced. The countercurrent flow washes the sodium-rich mother liquor from the glaserite, and the NaCl in the potash (excluding occluded NaCl) dissolves before the potash reaches the Stage 2 region. The potassium sulfate product can be washed in situ to remove sodium and chloride impurities from the mother liquor, which significantly improves product quality without additional capital and operating expenses.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a process for producing potassium sulfate from a sodium sulfate source and potash using differential countercurrent contacting. The term sodium sulfate source is meant to include anhydrous sodium sulfate, semi-anhydrous sodium sulfate, Glauber's salt, glaserite, vanthoffite, bloedite, aqueous sodium sulfate or any sodium sulfate solution which can yield sodium sulfate in the presence of sodium chloride, such as vanthoffite solution, and the like. Semi-anhydrous sodium sulfate is a mixture of sodium sulfate and Glauber's salt or partially hydrated sodium sulfate. The term 'potash' is meant to indicate any potassium chloride containing material including, for example, sylvinite.

Figure 4A:
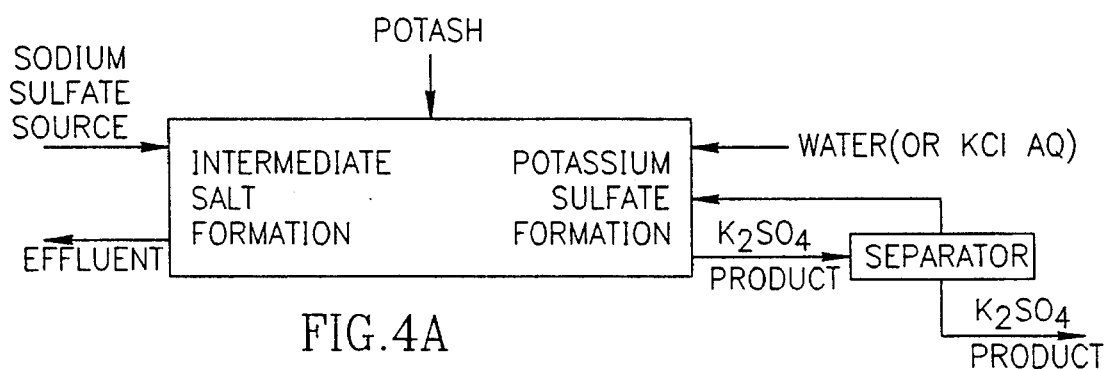
FIG. 4A is a block diagram representation of the one-stage differential countercurrent process of the present invention.

The principle and operation of a process according to the present invention can be understood with reference to FIG. 4A which represents an illustrative process in block diagram form. It is an essential feature of the present invention that countercurrent flow is established between the solid and liquid phases.

The differential, countercurrent contacting can, for example, be effected in the following manner. The sodium sulfate and potash solids are introduced near one end of a contactor. Water is added to the contactor near its opposite end, such that the solid and liquid phases flow in countercurrent fashion.

Figure 1:
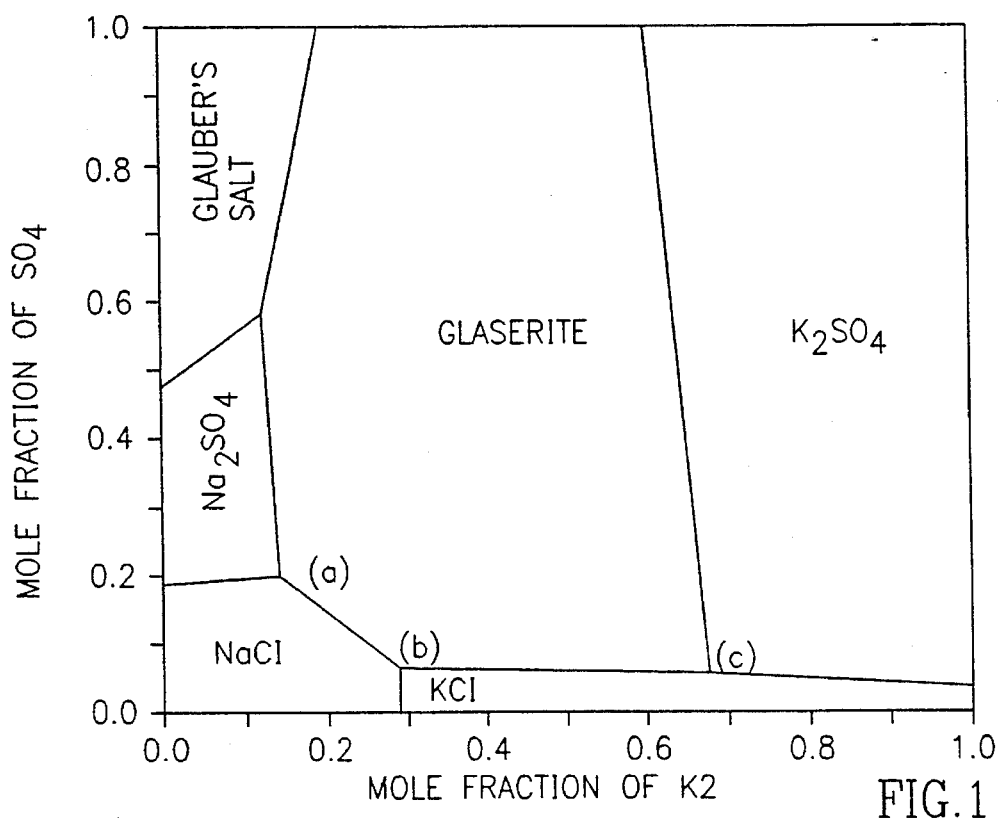
FIG. 1 is a Janecke phase diagram at 25° C. for the $Na_2SO_4/2NaCl/K_2SO_4/2KCl/H_2O$ system.
Figure 3:
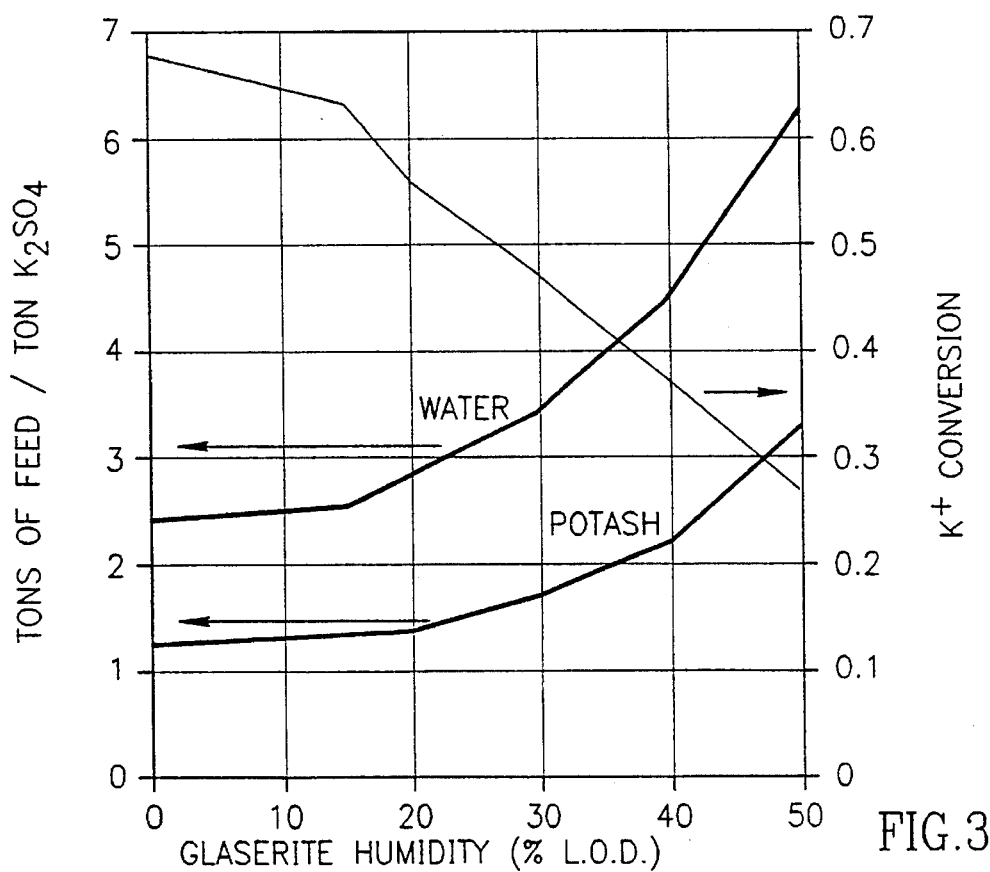
FIG. 3 shows the effect of glaserite humidity on process viability.

When the solid sodium sulfate contacts solution to the right of invariant point (a) in FIG. 1, the sodium sulfate dissolves, and the solution becomes supersaturated with respect to glaserite. The potassium chloride dissolves in a similar fashion when contacted by solutions to the left of invariant point (b) in FIG. 1, such that the solution becomes supersaturated with respect to glaserite.

The glaserite precipitates out of solution, and advances with any unreacted KCl, along the length of the contactor. The mother liquor surrounding the particles is gradually displaced by the countercurrent flow of solution, until the glaserite and KCl particles contact a solution with a composition to the right of and/or above invariant point (c) in FIG. 1, in which potassium sulfate is a stable phase.

Potassium sulfate precipitates out and advances along with unreacted glaserite and potassium chloride. When proper stoichiometric ratios of potash-to-sodium sulfate and water-to-salts are used, and when thermodynamic equilibrium is achieved, the glaserite and potassium chloride dissolve completely, such that a pure potassium sulfate product is produced.

In alternative embodiments, a potash solution can replace the feed water, provided that there is a corresponding decrease in the quantity of the solid potash feed, so that the amount of potash fed to the contactor remains substantially constant.

While effluent solution from the contacting process can have a composition of from invariant point (a) in FIG. 1 and above to the vicinity of invariant point (c) in FIG. 1, it is believed to be most advantageous to operate the process such that the effluent composition lies along or near the NaCl/glaserite equilibrium line.

Figure 5:
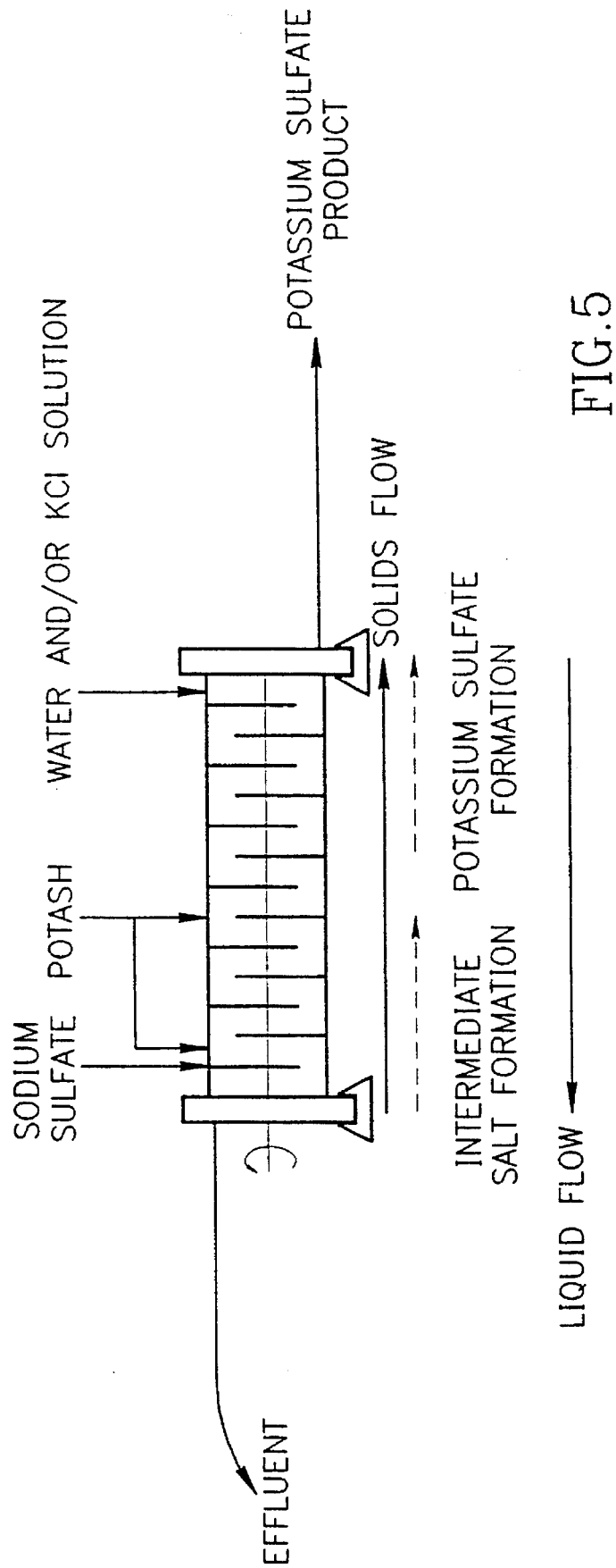
FIG. 5 shows a Graesser reactor such as might be used in a process according to the present invention.

Various vessels may be used to effect a differential countercurrent process according to the present invention. A typical vessel for effecting the present invention is the Graesser contactor which is a cylindrical vessel divided into a series of interconnecting compartments. This structure gives the Graesser contactor the characteristics of a multistage reactor. A schematic diagram of the process in a Graesser contactor is provided by way of example in FIG. 5. Differential contacting according to the present invention can also be achieved in various other kinds of contacting vessels, with or without the compartmental structure of the Graesser contactor.

Figure 2:
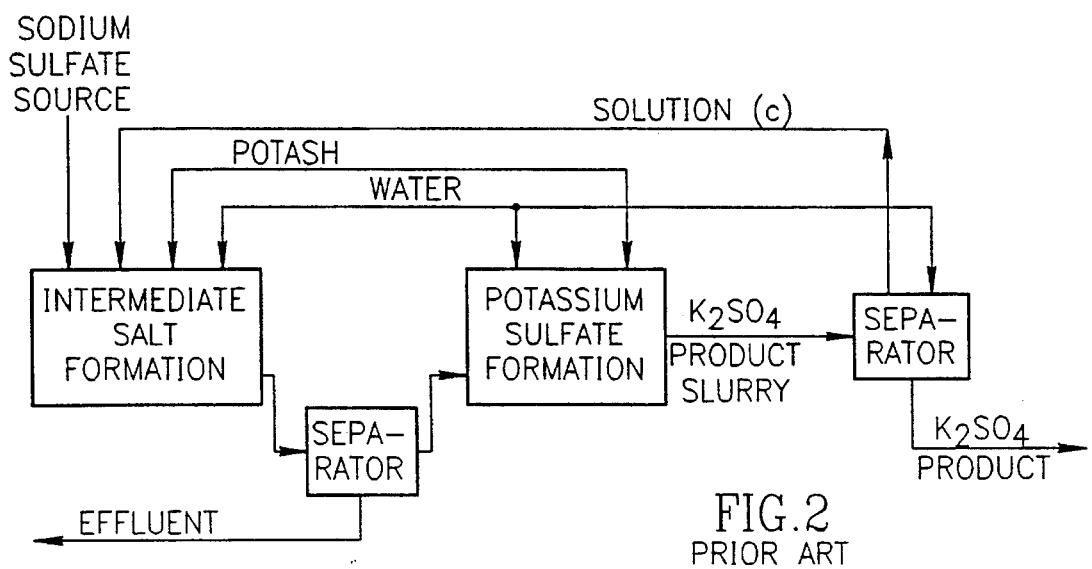
FIG. 2 is a block diagram representation of a two-stage potassium sulfate production process such as used in currently known processes.
Figure 4B:
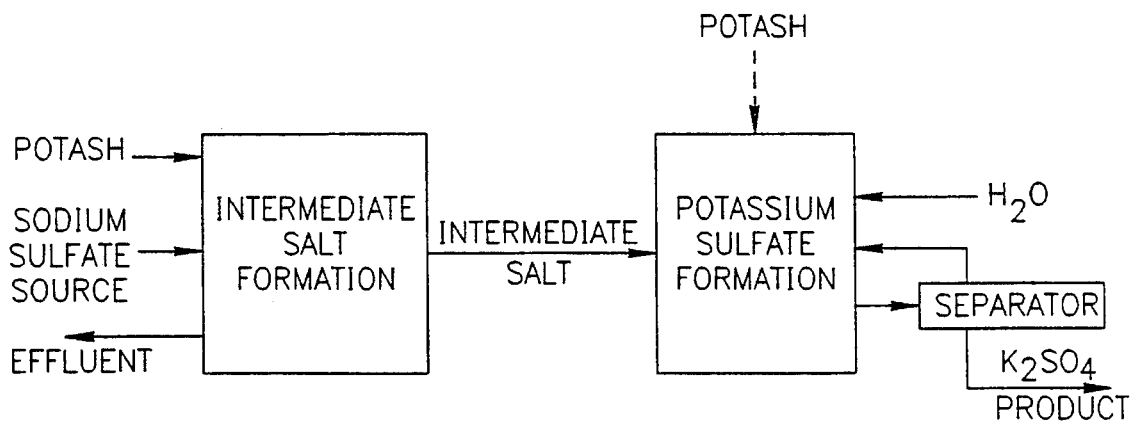
FIG. 4B is a block diagram representation of an alternative embodiment according to the present invention featuring a two-stage process, the second of which is differential countercurrent contacting.

In a further embodiment of processes according to the present invention shown schematically in FIG. 4B, the process is carried out in two stages, the second of which is a differential countercurrent contactor. In this version of the process, a slurry containing glaserite is formed in the first stage and is fed directly to the second stage, without using a separator as in the conventional two-stage system (FIG. 2). The process makes use of in-situ washing, rather than external washing, eliminates sodium chloride poisoning, and gives improved reaction kinetics compared with the conventional two-stage process (FIG. 2).

EXAMPLE 1

To one end of a Graesser-type differential countercurrent contactor are added 5.1 kg/h sodium sulfate of 99.7% purity and 4.8 kg/h potash containing 61.6% $K_2O$. Towards the far end of the vessel are added 18.5 kg/h of potash solution containing 16.2% potash by weight. In the ensuing countercurrent, multi-staged reaction, the potash and sodium sulfate are converted to the glaserite intermediate, which advances along the length of the contactor and subsequently decomposes, reacting with the dissolved potassium chloride to produce the potassium sulfate product. The system is operated until steady-state conditions are achieved. The product slurry is continuously removed from the vessel, and a solid/liquid separation is effected with a belt filter. The wet product, collected and weighed hourly, weighs ~6.2 kg. The dried, unwashed product contains 52% $K_2O$ and 0.95% $Cl^-$. The effluent solution exits from the other side of the contactor, and is collected in a graduated vessel at a rate of about 18 l/h. A quantitative chemical analysis of the solution yields the following composition: K—7.3%; Na—7.5%; $SO_4$—1.9%; Cl—16.5%; water-balance.

EXAMPLE 2

To one end of a Graesser-type differential countercurrent contactor are added 6.2 kg/h sodium sulfate of 99.1% purity and 8.8 kg/h potash containing 61.25% $K_2O$. Towards the far end of the vessel are added 17.5 l/h of water. In the ensuing countercurrent multi-stage reaction, potassium sulfate is produced. The countercurrent flow of water washes the potassium sulfate particle in situ. After steady state conditions have been achieved, the product slurry is continuously removed from the vessel and filtered. The production rate of wet potassium sulfate products is about 8 kg/h. The dried product contains 50.9% $K_2$ and 0.76% $Cl^-$. The effluent solution withdrawn from the other side of the contactor is collected in a graduated vessel at a rate of about 20 l/h. The effluent contains: K—6.4%; Na—8.0%; $SO_4$—1.7%; Cl—17.4%; water - balance.

While the invention has been described with respect to a limited number of embodiments, it will be appreciated that many variations, modifications, and other application of the inventions can be made.

What is claimed is:

1. Process for the manufacture of potassium sulfate from a solid sodium sulfate source, potash and water, comprising
   introducing the solid sodium sulfate source, water and potash into a single vessel differential countercurrent contactor; and
   causing said sodium sulfate source, potash and water to contact countercurrently and differentially so as to establish countercurrent flow between the solid and liquid phases to produce potassium sulfate.

2. A process as in claim 1, wherein at least some of said sodium sulfate source is introduced near a first end of said contactor and at least some of said potash is introduced as an aqueous solution near a second end of said contactor.

3. A process as in claim 1, wherein at least some of said sodium sulfate source is introduced near a first end of said contactor and at least some of said potash is introduced as a solid.

4. A process as in claim 3, wherein at least some of said potash is introduced near said first end of said contactor.

5. A process as in claim 3, wherein at least some of said potash is introduced in at least one intermediate location of said contactor.

6. A process as in claim 1, wherein said sodium sulfate source includes anhydrous sodium sulfate.

7. A process as in claim 1, wherein said sodium sulfate source includes bloedite.

8. A process as in claim 1, wherein said sodium sulfate source includes vanthoffite.

9. A process as in claim 1, wherein said sodium sulfate source includes Glauber's salt.

10. A process as in claim 1, wherein said sodium sulfate source includes semi-anhydrous sodium sulfate.

11. A process as in claim 1, wherein said sodium sulfate source includes aqueous sodium sulfate and a sodium chloride source.

* * * * *